United States Patent [19]

Anthon

[11] Patent Number: 5,070,507
[45] Date of Patent: Dec. 3, 1991

[54] THREE MICRON LASER

[75] Inventor: Douglas W. Anthon, Wheaton, Ill.

[73] Assignee: Amoco Corporation, Chicago, Ill.

[21] Appl. No.: 487,537

[22] Filed: Mar. 2, 1990

[51] Int. Cl.$^5$ .............................................. H01S 3/16
[52] U.S. Cl. ........................................ 372/41; 372/68
[58] Field of Search ....................... 372/41, 71, 75, 68

[56] References Cited

U.S. PATENT DOCUMENTS 3,781,707 12/1973 Hopkins et al. ........................ 372/41
3,786,365 1/1974 Robinson et al. ...................... 372/68
4,701,928 10/1987 Fan et al. .............................. 372/68

OTHER PUBLICATIONS

Caird et al. "Analysis of Laser Emission in Ho$^{30}$-Doped Materials" IEEE Journal of Quantum Electronics, vol. QE-11, No. 3 (Mar. 1975) pp. 97-99.
Antipenko et al. "Three Micron Laser Action in Dy$^{3+}$'- 'Soviet Journal of Quantum Electronics vol. 10, No. 5 (May 1980) pp. 560-563.
Allen et al. "Diode-Pumped 2$\mu$m Holmium Laser" Electronics Letters vol. 22, No. 947 (May 1986) pp.

Primary Examiner—Frank Gonzalez
Assistant Examiner—Susan S. Morse
Attorney, Agent, or Firm—James A. Gabala; William H. Magidson; Ralph C. Medhurst

[57] ABSTRACT

A laser system is disclosed wherein neodymium laser is used to pump a holmium laser to produce a moderately high energy output pulse at about 3 microns. The holmium host has a concentration of holmium in execcss of 15 percent and a praseodymium concentration of at least 0.005 percent.

40 Claims, 1 Drawing Sheet

THREE MICRON LASER

TECHNICAL FIELD

This invention relates to the general subject of solid-state pumped lasers and, in particular, to a solid-state laser which utilizes trivalent holmium as the active ion.

BACKGROUND OF THE INVENTION

There has been considerable interest recently in solid state lasers operating in the three micron region. This is primarily because the strong water absorption at 2.9 microns makes them useful for medical applications. Millijoule energies and microsecond pulse lengths at repetition rates of hundreds of hertz are typically desired Rare earth lasers based on either erbium or holmium can operate in this wavelength region.

Erbium lasers are well characterized, and have been pumped with flashlamps or with laser sources at several wavelengths. G. J. Kintz, R. Allen, L. Esterowitz, Appl. Phys Lett. 50, 1553–1556, (1987) and S. A. Pollack, D. B. Chang, N. L. Moise, "Upconversion-pumped Infrared Erinbum Laser", J. Appl. Phys 60(12), 4077–4086, 1986. The fact that the latter wavelength directly pumps the lower laser level is indicative of the complexity of these systems. Moreover, these lasers are relatively difficult to control because the population inversion is generated through a series of up- and down-conversion processes. Although efficient long-pulse or CW operation is possible, Q-switching tends to be inefficient. Up-conversion out of the upper laser level clamps the inversion near threshold and interferes with efficient energy storage. These lasers are also characterized by high thresholds, low repetition rates and a tendency to lase at more than one wavelength.

Holmium lasers are less well characterized, primarily because they do not lend themselves to flashlamp pumping. The Ho:YAG and Er:YAG systems are superficially quite similar. For example, the lifetimes of the upper and lower laser levels are quite similar in the two systems. The large differences in flashlamp-pumped performance in the two systems can be attributed to differences in the cross relaxation processes which occur in each material. However, the holmium ion has the interesting property that the upper state lifetime is shorter, and there are fewer favorable up-conversion processes occurring. Moreover, holmium has the interesting property that the laser upper level absorbs near 1.06 microns.

Lasers which can be pumped with neodymium lasers are of particular interest in cases where laser diode pumping is being considered. It is relatively easy to diode pump a well-behaved material, such as Nd:YAG, and to use the resulting beam for pumping. Laser diode photons have been converted to 1064 nm photons with efficiencies approaching 70%. At present, large diode-pumped lasers are quite expensive and therefore impractical for many applications. Today, small flash-lamp-pumped neodymium lasers are readily available and can be used as alternative pump sources until laser diode-pumped devices become more cost effective Several rare-earth lasers have been pumped with neodymium lasers. Ytterbium-sensitized materials have been pumped with 1.06 μm lasers (i.e., Galant (1978) and Antipenko (1984)). Work with holmium and erbium has also appeared recently (i.e., Rabinovich (1989) and V. I. Zhenkov et. al., "Lasing in $Y_3Al_5O_{12}$:$Er^{3+}$($\lambda = 2.94$ μm) Crystals as a result of Selective Excitation of the Lower Active Level," Kvantovaya Elektron. (Moscow) 16, 1138–1140 (June 1989). In all these cases, the absorptions were quite weak. This is because it is difficult to find coincidences between the narrow absorption and emission lines.

Previous efforts to pump holmium lasers with neodymium lasers used intracavity pumping so that the weak vibronic holmium absorption near 1.08 μm could be used for pumping. W. S. Rabinovich, S. R. Bowman and B. J. Feldman, "Laser Pumped 3 μ Ho:YALO Laser," Optical Society of America Annual Meeting, 1989 Technical Digest Series, Vol. 18, Washington, D.C., 1989), paper TU04.

Heretofore it has not been possible to flashlamp pump Ho:YAG at high holmium concentrations. When the holmium concentration was increased above about 10%, lasing ceased. A. A. Kaminskii, *Laser Crystals*, Springer-Verlag, Berlin, 1981, Chapter 7. In particular 2.94 micron lasing has not been observed in high holmium concentrations in Ho:YAG.

Co-doping experiments have been limited to holmium concentrations below 15%. M. Kh. Ashurov, Yu. K. Voronko, E. V. Zharikov, A. A. Kaminskii, V. V. Osiko, A. A, Sobol, M. I. Timoshechkin, V. A. Fedorov, and A. A. Shabaltai, "Structural, Spectroscopy and Stimulated Radiation of Yttrium-holmium-aluminum Garnet Crystals", Inorg. Mater., (USSR), 15, 979–983, 1979. In Ho:Ba $Y_2F_8$, 2.9 micron lasing was not observed with 10% Ho. L. F. Johnson and H. J. Guggenheim, "Electronic- and Phonon-Terminated Emission from $Ho^{3+}$ in $BaY_2F_8$", IEEE J. Quantum Electron., QE10(4), 442–449, 1974. Lasing has been observed by Antipenko in Ba $Yb_2F_8$ with 15% holmium, but it relied on a series of transfers from the ytterbium sensitizer. B. M. Antipenko, "Spectroscopic Schemes for Excitation of Laser Transitions having a High Quantum Efficiency of the Pumping Bands", Bull. Acad. Sci. USSR, Phys. Ser. 48, 30 124–129, 1984. Lasing in other crystals has been observed at low holmium concentrations A. A. Kaminskii, *Laser Crystals*, Springer-Verlag, Berlin, 1981, Chapters 4 and 7. In a 15% Ho, 1% Nd:YAG system, the $^5I_6$ lifetime was 40 μsec and the $^5I_7$ lifetime was 170 μsec. M. Bass, et. al. Appl. Phys. Lett. "Simultaneous Multiple Wavelength Lasing of (Ho, Nd):$Y_3Al_5O_{12}$", 51(17) 26 Oct. 1987, 1313-15. Increasing the holmium concentration in the system any further, resulted in a dramatic loss of holmium lifetime which was incompatible with flashlamp-pumped operation.

Since high holmium concentrations enhance the efficiency of energy transfer processes, it might be expected that selective quenching can be efficiently carried out in highly concentrated crystals. It has been demonstrated by Johnson et. al. and by others that co-doping holmium with praseodymium, europium or neodymium can have the desired effect. This is because there is a resonant transfer which allows efficient transfer out of the holmium $^5I_7$ level but no resonance for $^5I_6$ deactivation. For example in praseodymium, the process:

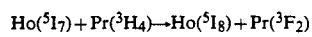

$$Ho(^5I_7) + Pr(^3H_4) \rightarrow Ho(^5I_8) + Pr(^3F_2)$$

is nearly resonant. Since it involves two high-cross-section transitions, it can occur very efficiently.

However, the usual technique has been to use a low holmium concentration and then increase the praseodymium concentration until quenching occurred. This technique causes several problems. First, it is usually difficult to incorporate praseodymium into laser crystals. The ionic radius is significantly larger than holmium or yttrium, and the distribution coefficients tend to be low. If higher concentrations are introduced, they tend to result in distorted crystals of poor optical quality. In YAG, praseodymium concentrations are usually limited to a fraction of a percent Similar comments apply to neodymium as well. In the case of europium, there is a significant absorption near 3 microns; thus, even if it were possible to grow the crystal with a high quencher concentration, the resulting absorption might hurt the laser's performance.

Thus, previous attempts to flashlamp pump a holmium laser in the 3 micron region at high holmium concentrations have not been successful. Moreover, despite the fact that the mechanism of quenching in rare earth crystal is well understood, it has proven to be difficult to implement this theory in a practical laser. In addition, CW operation of a holmium laser in the 3 micron region has not been possible.

Summary of the Invention

One object of the present invention is to disclose a means by which a Ho:YAG or Ho:GGG laser can be pumped with $Ho^{3+}$ concentrations up to 100%.

Another object of the invention is to disclose a Ho:YAG laser as a 3 micron down-converter for a Nd:YAG or similar laser.

Yet another object of the invention is to disclose a lasant material suitable for use as a laser-pumped 2.97 micron laser using the holmium $^5I_6 \rightarrow ^5I_7$ transition.

Still another object of the invention is to disclose a means by which a praseodymium doping may be used to reduce the terminal lend lifetime so as to eliminate the self terminating nature ordinarily resulting from high holmium concentrations.

In one specific embodiment of the invention a solid-state laser operating in the 3 micron region is disclosed. Specifically, that laser system comprises: a neodymium laser characterized by a pumping wavelength; and a holmium laser which is pumpingly coupled to the neodymium laser for strong absorption at the pumping wavelength and which comprises a holmium lasant garnet having a holmium concentration in excess of 15 percent and having been doped with praseodymium to have the $^5I_7$ lifetime shorter than the $^5I_6$ lifetime of holmium. One important new result of the present invention is that high concentrations of holmium can be used (e.g., in a holmium garnet) by doping with very small amounts of praseodymium (e.g., about 0.1% in the melt, and probably 0.01% in the crystal). In undoped holmium aluminum garnet ($Ho_3Al_5O_{12}$ or HoAG), the $^5I_7$ lower state is relatively long lived (e.g., 0.9 m sec). The praseodymium doping reduces the $^5I_7$ lower state lifetime to roughly 1 $\mu$sec, while the $^5I_6$ upper state lifetime is only reduced from about 31 $\mu$sec in HoAG to about 18 $\mu$sec. The praseodymium eliminates the self-terminating nature of the lasing transition and opens up the possibility of high kilohertz repetition rates and CW lasing. Before it was necessary to want several milliseconds until the lower level decayed before pumping with another pulse. CW lasing had not been possible.

By going to a high holmium concentration and a very low quencher concentration, the problems previously associated with praseodymium incorporation are no longer present. Furthermore, praseodymium has a relatively low three micron absorption. Therefore, low concentrations should have negligible effect on the laser properties of the crystal. In any event, concentration quenching of the $^5I_6$ level is not too serious, and with direct pumping, 2.94 micron lasing should be expected at all holmium concentrations. In experiments with 1123 nm pulse pumping, the laser performance was found to be almost independent of concentration for holmium concentrations from 15% to 100%. The higher concentrations are actually slightly more efficient because of the higher pump absorption.

Numerous other advantages and features of the present invention will become readily apparent from the following detailed description of the invention, the embodiments described therein, from the claims, and from the accompanying drawings.

DETAILED DESCRIPTION OF THE PREFERRED EMBODIMENTS OF THE INVENTION

Figure 1:
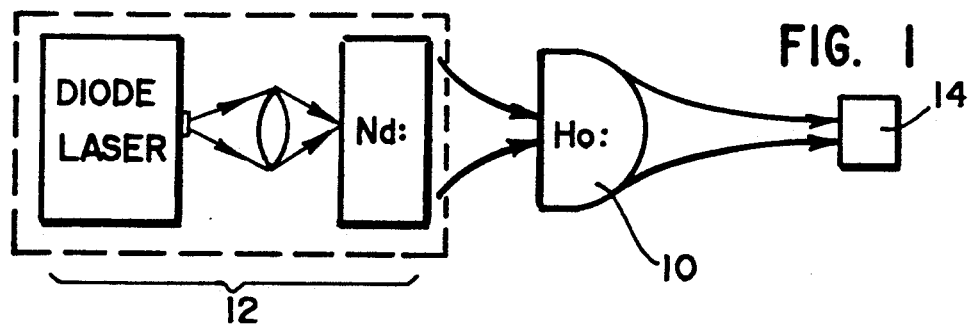
FIG. 1 is a block diagram cf a laser system incorporating the principles of the present invention.

While this invention is susceptible of embodiment in many different forms, there is shown in the drawings and will herein be described in detail several specific embodiments of the invention. It should be understood, however, that the present disclosure is to be considered as a exemplification of the principles of the invention and is not intended to limit the invention to any specific embodiment.

Those skilled in the art know that laser pumping is simplified if there is strong absorption at the pump wavelength. One useful rare earth absorption band is the $^5I_8 \rightarrow ^5I_6$ transition in holmium. Pumping holmium with a neodymium laser exploits the overlap of the longest wavelength neodymium $^4F_{3/2} \rightarrow ^4I_{11/2}$ transitions with the shortest wavelength holmium $^5I_8 \rightarrow ^5I_6$ absorptions.

Figure 2:
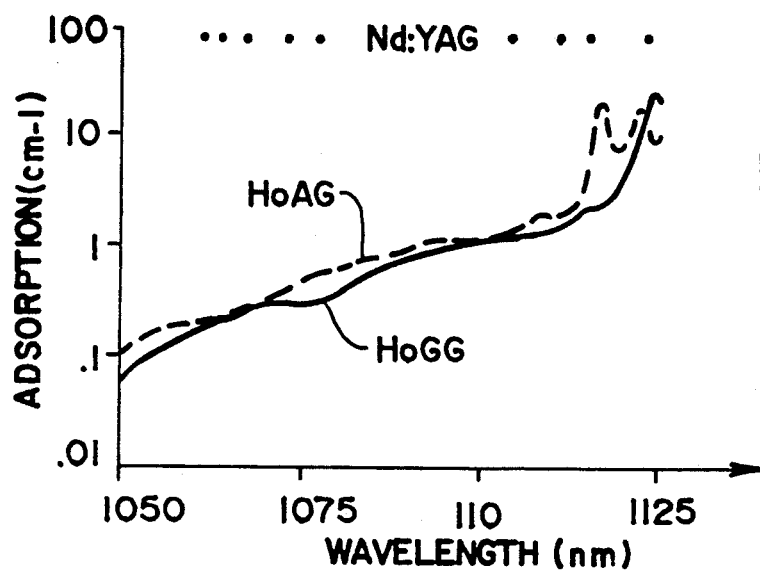
FIG. 2 is a graph of the absorption spectra for HoAG and HoGG in the wavelength region of the $^5I_8$ to $^5I_6$ holmium transition.

FIG. 2 shows the absorption coefficient for HoAG and HoGG in the wavelength region of neodymium transition. The lasing transition in Nd:YAG are shown at the top of the figure. The spectroscopic properties of Ho:YAG has been reported by Ashurov et. al. in some detail.

The HoAG and HoGG spectra are quite similar except for about a 7 nanometer wavelength shift. This shift is apparent in both the shift of the first peak from 1117 to 1124 nm and in the shift in the features of the vibronic bands near 1080 nm. There is a small peak at 1109 nm in YAG and 1116 in HoGG. The origin of this peak is unclear, as it is not observed when the holmium concentration is reduced to 15%. At the 1122.5 nm Nd:YAG line, the holmium absorptions in HoAG (100% Ho:YAG) and HoGG are $11^{-1}$ cm 8 cm$^{-1}$, respectively.

Modifying the crystal composition slightly to adjust the lattice constant should improve the overlap somewhat. By using host crystals with large crystal fields, such as garnets (i.e., YAG, GGG, etc.), it should be possible to shift the edges of the two transitions into coincidence.

Within the framework of the garnet crystals, for example, scandium is useful. For example, by shifting the neodymium host from YAG to YSAG, the 1122.5 nm peak can be shifted to 1118 nm. Similar spectral shifts are to be expected for holmium in GSAG or GSGG. Other materials such as Li $Y_{02}$ would shift the neodymium line to even longer wavelengths, making it possible to pump an even larger variety of holmium-containing crystals.

In general the class of garnet crystals covered by this invention can be described by the formula:

$(Ho_xA_yB_{1-x-y})_3(C)_2(D)_3O_{12}$, where 

A is chosen from the group (Pr, Nd, or Eu);
B is chosen from the group (Y, Gd, or Lu);
C is chosen from the group (Sc, Al, or Ga);
D is chosen from the group (Al, or Ga);
x is larger than 15% and preferably greater than 20%;
and y is typically less than 0.01 or 1%.

Other related compositions (e.g., B=La, C=Lu, D=Ga) also exist. The crystal chemistry of the garnet system is described at length by S. Geller, "Crystal Chemistry of the Garnets," Zeitschrift fur Kristalographie. Bd. 125 S.1–47 (1967). The percent concentrations heretofore used reflect the values of x and y (e.g., 10% Ho:YAG refers to the case where x=0.1, y=0, B=Y, and C=D=Al).

Nd:YAG is generally efficient when operated at 1064 nm. Vibronic transitions in the 1064 nm region give an absorption of roughly 0.25 cm$^{-1}$ in HoAG. This absorption is actually larger than that of many commonly used ytterbium-containing materials. Pumping of holmium (e.g., Ho:YAG or Ho:GGG) at this wavelength should be no worse than pumping ytterbium.

Lifetimes of the $^5I_6$ and $^5I_7$ levels have been measured in both YAG and GGG as a function of concentration. The results are shown in Table One:

TABLE ONE

| Composition | Lifetimes (μsec) | | Down conversion | |
|---|---|---|---|---|
| | $^5I_6$ | $^5I_7$ | $^5I_5$ | $^5S_2$ |
| 16% Ho:YAG | 47 | 5160 | .25 | 0.9 |
| 30% Ho:YAG | 46 | 3400 | .50 | 1.0 |
| 51% Ho:YAG | 43 | 1900 | .75 | 1.0 |
| 100% Ho:YAG | 29 | 940 | .90 | 1.0 |
| 19% Ho:GGG | 390 | 6500 | .40 | 1.0 |
| 32% Ho:GGG | 361 | 5160 | .60 | 1.0 |
| 60% Ho:GGG | 216 | 2480 | .95 | 1.0 |
| 100% Ho:GGG | 56 | 680 | 1.0 | 1.0 |

Crystals of both materials were grown using the conventional Czochralski method with holmium concentrations varying from 15% to 100%. The fluorescence lifetimes and down-conversion branching ratios were measured by selectivity exciting the various holmium levels with a Ramanshifted dye laser or 1123 nm Nd:YAG laser and time resolving the 2 micron emission from the $^5I_6$ and $^5I_7$ levels. The emission was detected with suitably filtered germanium or indium arsenide photodiodes. The same $^5I_6$ lifetime can be observed as the falltime of either the 1.2 or 3 micron emission or as the the risetime of the 2 micron emission. The $^5I_7$ lifetime was determined from the falltime of the 2 micron emission. All decays were well represented by a single exponential over at least two lifetimes.

The lifetimes in Ho:YAG are similar to those reported previously by M. Kh. Ashurov et. al., except that the lifetime of the $^5I_7$ level in HoAG was 940 rather than 300 microseconds at 100% Ho. This difference could be due to a lower crystal water content. HoAG lifetimes should be quite sensitive to the presence of trace rare-earth contaminants such as Tb or Dy, so the differing lifetimes may simply reflect differences in the impurity content of the crystals.

In any event, concentration quenching of the $^5I_6$ level was not too serious, and with direct pumping, 2.94 microns lasing should be expected at all holmium concentrations. Laser performance was found to be almost independent of concentration for holmium concentrations from 15% to 100%. The higher concentrations are actually slightly more efficient because of the higher pump absorption.

From Table One, it appears that previous efforts to flashlamp pump the 2.9 micron holmium laser at high holmium concentrations failed because of the two down-conversion processes from the $^5S_2$ and $^5I_5$ levels which cause the flashlamp energy to bypass the desired $^5I_6$ upper laser level and to directly populate the lower $^5I_7$ laser level. Both of these processes allow the lower laser level to be populated with high quantum efficiency, while a large fraction of the excitations completely bypass the upper laser level. It is difficult to achieve a population inversion in this type of system except at low concentrations where the down-conversion is minimized.

The efficiency of the various down-conversion processes can be determined from the risetime of the $^5I_7 \rightarrow {}^5I_8$ emission at 2 microns after pulsed excitation. The lifetimes of the states above the $^5I_6$ are no more than few microseconds, so all cross relaxation will occur within a few microseconds of excitation. Decays, which proceed via the $^5I_6$ level, will be delayed by this lifetime. Thus, prompt emission is due to cross relaxation and delayed emission is due to multiphonon decay via the $^5I_6$ level.

Figure 3:
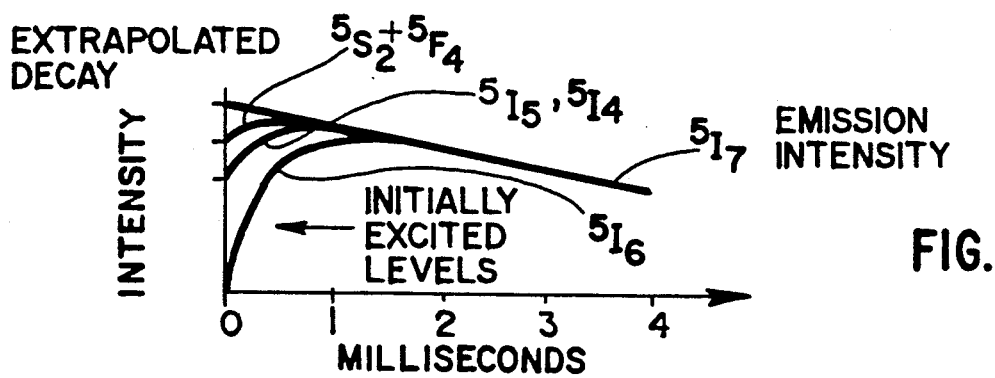
FIG. 3 is a graph of $^5I_7$ emission in 15% Ho:GGG.
Figure 4:
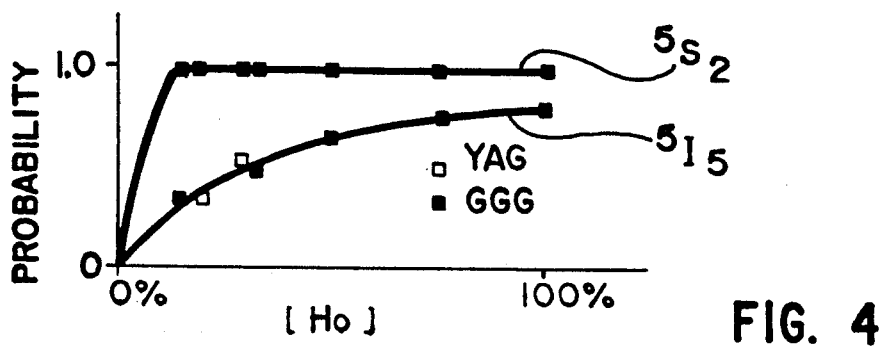
FIG. 4 is a graph of cross relaxation probabilities as a function of holmium concentration.

FIG. 3 shows the two micron risetimes observed in 15% Ho:GGG at several excitation wavelengths. The 2 micron emission was detected with an indium arsenide photodiode at 77° K, using 2 mm of germanium and 4 mm Schott BG-40 glass as a filter. The excitation pulses (less than 10 ns) were from a Nd:YAG-pumped dye laser, Raman shifted in hydrogen. Exciting directly into the $^5I_6$ level results in no prompt emission; this state appears to decay almost entirely by multiphonon processes. Excitation into the $^5I_5$, $^5I_4$, or $^5F_5$ levels produces essentially identical decays with the same large prompt component. This indicates that the two higher energy states undergo rapid relaxation into the $^5I_5$ level; roughly 40% of the atoms in this level then decay via cross relaxation. Finally, excitation into the $^5S_2 + {}^5F_4$ levels produces an even larger prompt component. This indicates that this state decays the almost entirely by cross relaxation. Furthermore, the cross relaxation process produces an excitation in the $^5I_5$ level which can undergo the cross relaxation process associated with direct excitation to this state. FIG. 4 shows the probability of both relaxation processes in YAG and GGG as a function of holmium concentration.

These down-conversion measurements suggest that the most efficient method for producing an inversion on the three micron transition is the populate the $^5I_6$ level directly without populating the higher lying levels. Other pumping schemes, such as using an 890 nm diode laser to directly pump the $^5I_5$ level, will lead to down-conversion.

One of the simplest ways of achieving selectivity is to use a Nd:YAG laser as a pump. By using a pump pulse which is shorter than the $^5I_6$ lifetime, it should be possible to efficiently gain switch the laser.

EXAMPLE 1

Referring to FIG. 1, laser experiments were carried out by end pumping 4 mm long, monolithic, plano convex laser rods 10 of Ho:YAG. Radii of 10 mm or 300 mm were used to form the resonator. The flat or plano end of the rod was coated to be highly reflecting (HR) at 2.94 microns and highly transmitting (HT) at 1123 nm; the curved end of the rod was 99.5% reflecting at 2.94 microns. The monolithic laser cavities avoided the problems with atmospheric water absorption. The pumping laser 12 consisted of a prism-tuned, 10 Hz, flashlamp pumped Nd:YAG laser with an E-0 Q-switch. Of course, a laser diode could be used to pump the Nd:YAG laser into operation. The pulse width varied from 170 to 90 ns (FWHM) as the output power increased from 0.5 to 2 mJ at 1123 nm. The pump beam was focused to a 100 micron radius spot at the flat end of the laser rod 10. Laser output was detected with a germanium-filtered indium arsenide photodiode 14 at 77° K or a pyroelectric detector. Threshold for 2.94 micron lasing was found to be less than .20 mJ cm$^{-2}$. This is more than two orders of magnitude less than the damage threshold for the coating, and corresponds to an absorbed energy of less than 10 microjoules. Slope efficiencies were relatively low (i.e., less than 1%); this is probably due to insufficient output coupling. The output was in the form of a single pulse which with a detector-limited duration of a few microseconds. Lasing was only observed at 2.94 microns. Similar low thresholds were achieved for holmium concentrations from 15% to 100%.

EXAMPLE 2

Decreasing the output reflectivity to 98%, increased the output significantly. The pump spot radius was 250 microns, while the calculated mode size in the 4 mm-long, 10 mm radius laser rod was 50 microns. This is not optimum focussing, but it allows the comparison of the different concentrations. Slope efficiencies clearly increased with holmium concentration. This is partly attributable to the lower absorption in the more dilute samples; the 15% sample absorbs only half the pump beam. The behavior of the thresholds is more unusual; if absorption were the only effect, then the thresholds should decrease with increasing absorption. However, the 15% sample showed the lowest threshold, as well as the lowest slope. This suggests that there is an additional passive loss associated with the holmium concentration, which raises the threshold for the more concentrated samples. This could be due to F-center formation, or possibly related to non-stoichiometric holmium ions substituted into the octahedral aluminum site. M. Kh. Ashurov et. al. have reported that such substitution occurs for holmium concentrations above 20%, and that it can be eliminated by the addition of a few percent scandium oxide to the melt. The laser performance of scandium-substituted holmium aluminum garnets was tested in Example 7.

EXAMPLE 3

At 98%R, in HoAG, 2.94 μm, pulsed emission with a threshold of 100 μJ and a slope efficiency of 6% was observed for 150 ns pulses. All Ho concentrations exhibited similar slope efficiencies under these conditions, but the threshold increased by a factor of two on going from 15% to 100% holmium. Coating damage limited the input energy to a few J/cm$^2$, typically an order of magnitude above the lasing threshold.

The observed 6% efficiency is not too far from what would be expected from this system. The Stokes efficiency for this system (1.12/2.94) is 38%. Because the transition is self-terminating, the efficiency will depend on the splittings and Boltzmann factors for the two laser levels. Using the energy levels from M. Kh. Ashurov, only 66% of the pump photons can be extracted at 2.94 microns. This gives an overall maximum efficiency of 25%. The observed efficiency is only a factor of four from the theoretical maximum, and it is likely that further optimization of the system is possible.

Table One suggests that direct pumping of the $^5I_6$ level could be enhanced with judicious use of sensitizers. However, the sensitizer to use is not obvious. For example, ytterbium sensitizers have been reported by Antipenko to introduce up-conversion problems.

Referring to Table One, since short $^5I_7$ lifetimes are desirable, praseodymium co-doping was tested as a means of reducing the lifetime. These results are shown in Table Two:

TABLE TWO

| Composition | Lifetimes (μsec) | | Down-conversion | |
|---|---|---|---|---|
| | $^5I_6$ | $^5I_7$ | $^5I_5$ | $^5S_2$ |
| 0.01% Pr:HoAG | 18 | <5 | — | — |
| 1% Pr,25% Ho:GGG | 240 | 45 | — | — |

EXAMPLE 4

Two praseodymium doped samples were grown. The first was 0.01% Pr:HoAG, which was chosen to maximize the pump absorption, even at the expense of the upper state lifetime. This is acceptable with pulse pumping where relatively short upper state lifetimes can be tolerated. A second sample with the composition 1% Pr,25% Ho:GGG was also grown; this was intended to keep the $^5I_6$ lifetime as long as possible and to permit CW lasing. Table Two shows that in both cases the $^5I_7$ lifetime is much shorter than the $^5I_6$ lifetime and the transition is no longer self terminating.

In a crystal of 25% Ho, 1%Pr:GGG, the $^5I_6$ lifetime was reduced from 365 to 230 microseconds and the $^5I_7$ falltime went from 6200 to 370 microseconds. This is almost short enough to allow CW lasing. However, the $^5I_7$ decay was not a simple exponential, but exhibited a 45 microsecond risetime and a 350 microsecond falltime. This occurs because the $^5I_7$ decay is not a true single exponential in this sample; the observed decay can be reproduced by assuming a $^5I_7$ decay of the form $0.95 \exp(-t/45) + 0.05 \exp(-t/350)$. This suggests that roughly 5% of the ions are in isolated sites which decay as if no Pr ions were present. Cross section measurements were not made; however, based on Judd-Ofelt calculations, the gain cross section is expected to be comparable to that of the 2 micron holmium transition, or a few pm$^2$. The lifetimes and cross sections for the three micron transitions in holmium and erbium are nearly the same. Thus, the properties of these two lasers should be comparable.

EXAMPLE 5

Further measurements were made using an etalon-tuned, CW-pumped, Q-switched Nd:YAG laser to pump the praseodymium doped samples. Pulses of several mJ at several kHz were obtained from the pump laser. The multi-transverse mode pulses varied from 1 to 3 μsec in duration. Operation of the laser was somewhat humidity sensitive due to the atmospheric water absorptions coincident with the 1116 nm and 1123 nm transitions. CW outputs of up to 20 W at 1116 nm or 1123 nm were obtained.

EXAMPLE 6

Plano-plano laser rods 2 mm thick, coated as before with 98% R, were used for both materials. This rod length is too short for efficient absorption in the 1% Pr,25% Ho:GGG sample, and only 30% of the pump was absorbed. Lasing of the CW end-pumped 0.01% Pr:HoAG was observed at two wavelengths, 2.85 and 94 μm with a ill-defined threshold of several watts and an output consisting of occasional, irregular spiking. CW-pumped GGG produced true CW lasing, albeit with a considerable amount of spiking. Since the amplitude of the pump beam is somewhat unstable, such spiking is not unexpected. Under CW pumping, a threshold of 0.8 W absorbed was observed for 2.85 μm lasing, with a second line at 2.89 μm appearing at 2.7 W. The slope efficiency (based on absorbed power) was With pulse pumping at 2.5 kHz, thresholds of 70 μJ and slope efficiencies in excess of 10% have been observed for GGG, with lasing occurring at both 2.85 and 2.89 μm. The output is found to consist of 1 to 10 relaxation spikes which occur during the 1 to 3 μs pump pulse. Under similar conditions, HoAG had a threshold of 140 μJ and a slope efficiency of 4%. This suggests that GGG is more efficient than HoAG. However, this may be misleading because the average power dependences caused by thermal effects in the plano-plano cavity have not yet been fully characterized, and further increases in the efficiencies of both materials may be possible.

EXAMPLE 7

A crystal from a melt of the composition (Ho$_{0.999}$Pr$_{0.001}$)$^3$(Al$_{0.98}$Sc$_{0.02}$)$^5$O$_{12}$ was tested. According to Kaminskii, the addition of scandium should serve to eliminate excess holmium atoms at the octahedral aluminum site. It wasn't expected to have such affect on the quenching.

A boule of PrSc:HoAG was excited with a 200 ns pulse at 1123 nm from a Q-switched Nd:YAG laser 12, and the emission at 1.2, 2 and 3 microns was measured. The 1.2 micron emission was measured with a germanium photodiode 14, filtered with silicon wafer and Wratten 87-A filters. The time resolution of the detector was about 1 microsecond. The 2 and 3 micron emissions were detected with a germanium-windowed InAs photodiode at 77° K. Time resolution of about 7 microseconds was achievable. With no additional filters, this detected emission at both wavelengths; the 2 micron emission could be isolated by the addition of 6 mm of BG-40 glass.

EXAMPLE 8

The 1.2 micron decays were measured for 15% Ho:YAG, HoAG and PrSc:HoAG. The 1/e lifetimes were, respectively, 46, 31 and 18 microseconds. Emissions from HoAG and PrSc:HoAG were also measured. The 3 micron emission appeared to be relatively unchanged between the two crystals, consistent with the 1.2 micron data. The 2 micron data, on the other hand, indicated that the praseodymium was greatly quenched the $^5I_7$ level in PrSc:HoAG. The emission curve had the same shape as the 3 micron decay and has roughly an order of magnitude less intensity. This is consistent with a $^5I_7$ lifetime somewhere between 0.5 and 5 microseconds. Thus, the praseodymium had reduced the $^5I_6$ lifetime by only 40% while reducing the $^5I_7$ lifetime by almost three orders of magnitude.

From the foregoing description, it will be observed that numerous variations, alternatives and modifications will be apparent to those skilled in the art. Accordingly, this description is to be construed as illustrative only and is for the purpose of teaching to those skilled in the art the manner of carrying out the invention. Various changes can be be made in the shape, size and arrangement of parts, and equivalent elements can be substituted for those illustrated and described herein.

For example, although spectroscopic properties of the new crystal of Example 8 are almost ideal for repetitive pulse pumping, it may be advantageous to add even more praseodymium. As it stands, another 40% reduction in the $^5I_7$ lifetime would still be acceptable, if it were possible to reduce the $^5I_6$ lifetime below 100 ns (i.e., to reduce it below the pump pulse length). This should result in more efficient gain switching and would therefore be advantageous. On the other hand, the extreme shortening of the $^5I_7$ lifetime already achieved suggests that CW oscillation is feasible. In this case, however, it might eventually be desirable to increase the $^5I_6$ lifetime somewhat even if it leads to a slight increase in the $^5I_7$ lifetime. This would suggest that crystals grown from melts with compositions like (Ho$_{0.999}$Pr$_{0.001}$)$_3$Ga$_5$O$_{12}$ with 0.99999 pure starting materials might be suitable, since the $^5I_6$ lifetime is 70 μsec or greater in the absence of praseodymium.

Thus, it will be appreciated that various modifications, alternatives, variations, etc., may be made without departing from the spirit and scope of the invention as defined in the appended claims. It is, of course, intended to cover by the appended claims all such modifications as fall within the scope of the claims.

I claim:

1. A solid-state laser system operating in the three micron region, comprising:
   a) pumping laser means characterized by a pumping wavelength at about 1.1 microns; and
   b) holmium laser means which is pumpingly coupled to said pumping laser means for strong absorption at said pumping wavelength and which comprises a holmium lasant material having a holmium concentration in excess of 15 percent.

2. The system of claim 1, wherein said lasant material is doped to quench the $^5I_7$ level of holmium.

3. The system of claim 1, wherein said pumping laser means comprises a neodymium host crystal for producing a pumping wavelength of about 1.12 microns.

4. The system of claim 1, wherein said lasant material is selected from the group consisting of the rare earth aluminum, gallium and scandium garnets 5. The system of claim 1, wherein the holmium concentration of said lasant material ranges from 20 to 100 percent.

6. The system of claim 1, wherein said lasant material is co-doped to have the $^5I_7$ lifetime shorter than the $^5I_6$ lifetime of holmium.

7. The system of claim 1, wherein said pumping laser means comprises at least one laser diode pumping at about 1.15 microns.

8. The system of claim 7, wherein said lasant material comprises a crystal of about 0.01% Pr:HoAG.

9. The system of claim 7, wherein said lasant material comprises a crystal of about 1% Pr, 25% Ho:GGG.

10. The system of claim 1, wherein said holmium laser means is pulse pumped by said pumping laser means.

11. The system of claim 10, wherein said neodymium laser means comprises a lamp-pumped, Q-switched, Nd:YAG laser which emits pulses at a wavelength of 1123 nm and which is end-pumped to said holmium laser means, said pulses having width of less than 500 μsec.

12. The system of claim 11, wherein said holmium lasant material comprises a crystal of Ho:YAG having a flat end which is coated to be highly reflecting at about 2.94 microns and highly transmitting at about 1123 nm and has an opposite end which is coated to be in excess of 95 percent reflecting at about 2.94 microns.

13. The system of claim 10, wherein said pumping laser means emits pumping pulses which are shorter than the lifetime of the $^5I_6$ lifetime of holmium.

14. The system of claim 1, wherein said pumping laser means includes means for substantially directly pumping the $^5I_6$ level of said holmium laser means.

15. The system of claim 1, wherein said holmium lasant material is co-doped with a rare earth selected from the group consisting of neodymium, europium and praseodymium in an amount to permit CW pumping by said pumping laser means.

16. The system of claim 15, wherein said holmium lasant material is a garnet which is doped with holmium and which is selected from the group consisting of YAG, GGG, YSAG, GSAG, and GSGG.

17. A laser comprising: a lasant host whose holmium concentration is in excess of 15% and which is adapted to be pumped by at least one optical pulse whose wavelength is about 1.12 microns and whose width is shorter than the $^5I_6$ lifetime of holmium.

18. The laser of claim 17, wherein said lasant host is a garnet crystal.

19. The system of claim 17, wherein said holmium laser comprises a crystal from a melt having a composition $(Ho_xPr_y)_3(Al_aSc_5)_5O_{12}$ where $x+y \leq 1$ and $a+b \leq 1$ and a, b, x and y are representative of the atomic weight percentages.

20. The laser of claim 17, wherein said holmium laser is pumped by a laser having a neodymium host.

21. The laser of claim 20, wherein said neodymium host comprises Nd:YAG and said holmium laser is pumped by a plurality of pulses at about 1123 nm.

22. The laser of claim 17, wherein said lasant host is pumped by a laser diode.

23. The laser of claim 17, wherein said pulse has a width of less than 300 nsec.

24. The laser of claim 17, wherein the pulse width of said pumping pulse is sufficiently short to switch said holmium laser.

25. The laser of claim 17, wherein said holmium host is co-doped with a rare earth selected from the group consisting of europium, neodymium, and praseodymium.

26. In a laser system wherein neodymium laser means is used to pump a holmium laser to produce a moderately high energy output pulse at about 3 microns, a holmium host having a concentration of holmium in excess of 15 percent and having a concentration of praseodymium in an amount of at least 0.01 percent.

27. The system of claim 26, wherein said neodymium laser means is a neodymium laser having pumping wavelength of about 1.11 microns.

28. A solid-state laser system operating in the three micron region, comprising:

a) pumping laser means characterized by a pumping wavelength;
b) holmium laser means which is pumpingly coupled to said pumping laser for strong absorption at said pumping wavelength and which comprises a holmium lasant material having a holmium concentration in excess of 15 percent; and
c) population control means, carried by at least one of said pumping laser means and said holmium laser means, for reducing the population of the $^5I_7$ level of holmium.

29. A solid-state laser system operating in the three micron region, comprising:
(a) pumping laser means characterized by a pumping wavelength;
(b) holmium laser means which is pumpingly coupled to said pumping laser for strong absorption at said pumping wavelength and which comprises a holmium lasant material having a holmium concentration in excess of 15 percent; and
(c) population control means, carried by at least one of said pumping laser means and said holmium laser means, for reducing the population of the $^5I_7$ level of holmium by avoiding down-conversion processes which have the effect of bypassing the $^5I_6$ level and directly populating the $^5I_7$ level of holmium.

30. A solid-state laser system operating in the three micron region, comprising:
(a) pumping laser means characterized by a pumping wavelength;
(b) holmium laser means which is pumpingly coupled to said pumping laser for strong absorption at said pumping wavelength and which comprises a holmium lasant material having a holmium concentration in excess of 15 percent; and
(c) population control means, carried by said holmium laser means, for reducing the population of the $^5I_7$ level of holmium, said population control means comprising a co-dopant of a rare earth selected from the group consisting of Eu. Nd and Pr in an amount of at least 0.005 percent which has the effect of shortening the lifetime of the $^5I_7$ level of holmium.

31. A solid-state laser system operating in the three micron region, comprising:
(a) pumping laser means characterized by a pumping wavelength;
(b) holmium laser means which is pumpingly coupled to said pumping laser for strong absorption at said pumping wavelength and which comprises a holmium lasant material having a holmium concentration in excess of 15 percent; and
(c) population control means, carried by said pumping laser means, for reducing the population of the $^5I_7$ level of holmium, said population control means comprising means for substantially directly pumping the $^5I_6$ level by using one or more pulses whose length is generally less than the lifetime of the $^5I_6$ level of holmium.

32. The system of claim 31, wherein said pulses are repeated at a rate generally greater than the lifetime of the $^5I_7$ level in holmium.

33. A laster having an output in the 3 micron region, comprising: a holmium laser which is substantially directly pumped to the $^5I_6$ level and which has a holmium host whose holmium concentration is in excess of 20 percent.

34. The laser of claim 33, wherein said holmium host is co-doped with a rate earth selected from the group consisting of europium, neodymium, and praseodymium.

35. The laser of claim 33, wherein said holmium host is doped in an amount to quench the $^5I_7$ level in an amount to have the $^5I_7$ lifetime shorter than the $^5I_6$ lifetime of holmium.

36. A lasant material for producing an output in the 3 micron region, comprising a garnet doped with a rare earth selected from the group consisting of holmium and erbrium to have a concentration of said rare earth in excess of 15 percent and co-doped with a rate earth selected from the group consisting of Pr, Eu and Nd in a concentration of at least 0.005 percent.

37. The lasant material of claim 36, wherein said garnet is selected from the group consisting of YAG, GGG, AG, GG, YSAG, GSAG, and GSGG.

38. The lasant material of claim 36, wherein said garnet is formed from a melt having the composition $(Ho_xM_y)_3(Al_{1-z}Sc_z)O_{12}$ where M is a rare earth selected from the group consisting of Pr, Eu and Nd, x is in excess of 15%, y is at least 0.005% and z is less than 5 percent.

39. The lasant material of claim 36, wherein said garnet is formed from a melt having the composition $(Ho_xM_y)_3Ga_5O_{12}$ where M is a rare earth selected from the group consisting of Pr, Eu, and Nd, x is in excess of 15%, and y is at least 0.005%.

40. The lasant material of claim 38, wherein M=Pr, x=99.99, y=0.01 and z=0.02.

* * * * *

UNITED STATES PATENT AND TRADEMARK OFFICE
CERTIFICATE OF CORRECTION

PATENT NO. : 5,070,507
DATED : December 3, 1991
INVENTOR(S) : Douglas W. Anthon

It is certified that error appears in the above-identified patent and that said Letters Patent is hereby corrected as shown below:

Col. 3, line 8, "percent Similar" should read --percent. Similar--.
Col. 4, line 63, "$11^{-1}$ cm 8 cm $^{-1}$" should read --11 $cm^{-1}$ and 8$cm^{-1}$--.
Col. 6, line 64, "is the populate" should read --is to populate--.
Col. 9, line 15-16 "2.85 and 94$\mu$m" should read --2.85 and 2.94$\mu$m--
    line 24-25 "...power) was with pulse" should read --...power) was 9%. With pulse--.
    line 39 "$_{0.001})^3 (Al_{0.98} Sc_{0.02})^5$" should read --$_{0.001})_3 (Al_{0.98} Sc_{0.02})_5$--

Col. 10, line 55, "garnets" should read --garnets.--
Col. 11, line 37, "The system..." should read --The laser...--.
    line 52, "to switch said" should read --to gain switch said--.
C0l. 13, line 14, "with a rate earth" should read --with a rare earth--.

Signed and Sealed this

Eighteenth Day of May, 1993

Attest:

MICHAEL K. KIRK

Attesting Officer      Acting Commissioner of Patents and Trademarks